US00RE49695E

(19) United States
(12) Reissued Patent
Fife

(10) Patent Number: US RE49,695 E
(45) Date of Reissued Patent: Oct. 17, 2023

(54) RV LEVELER

(71) Applicant: ETN Capital, LLC, Sanford, NC (US)

(72) Inventor: Taylor Fife, Sanford, NC (US)

(73) Assignee: ETN Capital, LLC, Sanford, NC (US)

(21) Appl. No.: 29/845,746

(22) Filed: Jul. 11, 2022

Related U.S. Patent Documents

Reissue of:
(64) Patent No.: Des. 949,746
Issued: Apr. 26, 2022
Appl. No.: 29/670,356
Filed: Nov. 15, 2018

(51) LOC (14) Cl. ..... 12-16
(52) U.S. Cl.
USPC ..... D12/106
(58) Field of Classification Search
USPC ..... D12/19, 100–106, 111–112, 129, 162; D21/425, 435; D34/12, 16–19, 21–26
CPC . B62D 35/02; B62D 35/00; B60P 3/10; B60P 3/1033; A62B 3/005
See application file for complete search history.

(56) References Cited

U.S. PATENT DOCUMENTS 2,450,648 A * 10/1948 Felzer ..... B66F 7/243 81/15.8
4,103,870 A * 8/1978 Murakami ..... B60C 27/00 81/15.8
D314,850 S 2/1991 Arnold
D365,908 S * 1/1996 Pesznecker ..... D34/32
D384,483 S * 9/1997 Buckman ..... D34/32
D386,462 S 11/1997 McCune et al.
6,644,628 B1 * 11/2003 Triche ..... B66F 7/243 248/188.2
D511,734 S * 11/2005 Moore ..... D12/217
D520,438 S 5/2006 Colak et al.
D567,471 S * 4/2008 Haimoff ..... D34/33
D625,678 S 10/2010 Heinz
D646,614 S * 10/2011 Brockington ..... D12/217
D678,647 S 3/2013 Parras
D705,514 S * 5/2014 Tai ..... D34/32
(Continued)

OTHER PUBLICATIONS

Andersen Hitches, "RV Accessories, 2-Pack Camper Leveler System Must Have RV, Lifetime Warranty Camping Easy Storage Jack stabilizer Block, Levelers Blocks for Campers and Fifth Wheels, 3604", Retrieved from the internet: URL: https://www.amazon.com/ANDERSEN-Accessories-Levelers-Leveling-Motorhome/dp/B01LYQ1Z8S/ [retrieved on Jul. 8, 2022], Oct. 16, 2016, pp. 1-6.
(Continued)

*Primary Examiner* — Darlington Ly
(74) *Attorney, Agent, or Firm* — COATS & BENNETT, PLLC

(57) CLAIM

The ornamental design for a RV leveler, as shown and described.

DESCRIPTION

FIG. 1 is a perspective view of an RV leveler showing my new design;
FIG. 2 is a left view of the RV leveler.
FIG. 3 is a right view of the RV leveler.
FIG. 4 is a top view of the RV leveler.
FIG. 5 is a bottom view of the RV leveler.
[FIG. 6 is a front view of the RV leveler; and,]
[FIG. 7 is a back view of the RV leveler.]
In the drawings, the broken lines depict portions of the article that form no part of the claimed design.

1 Claim, 7 Drawing Sheets

Figure 1:
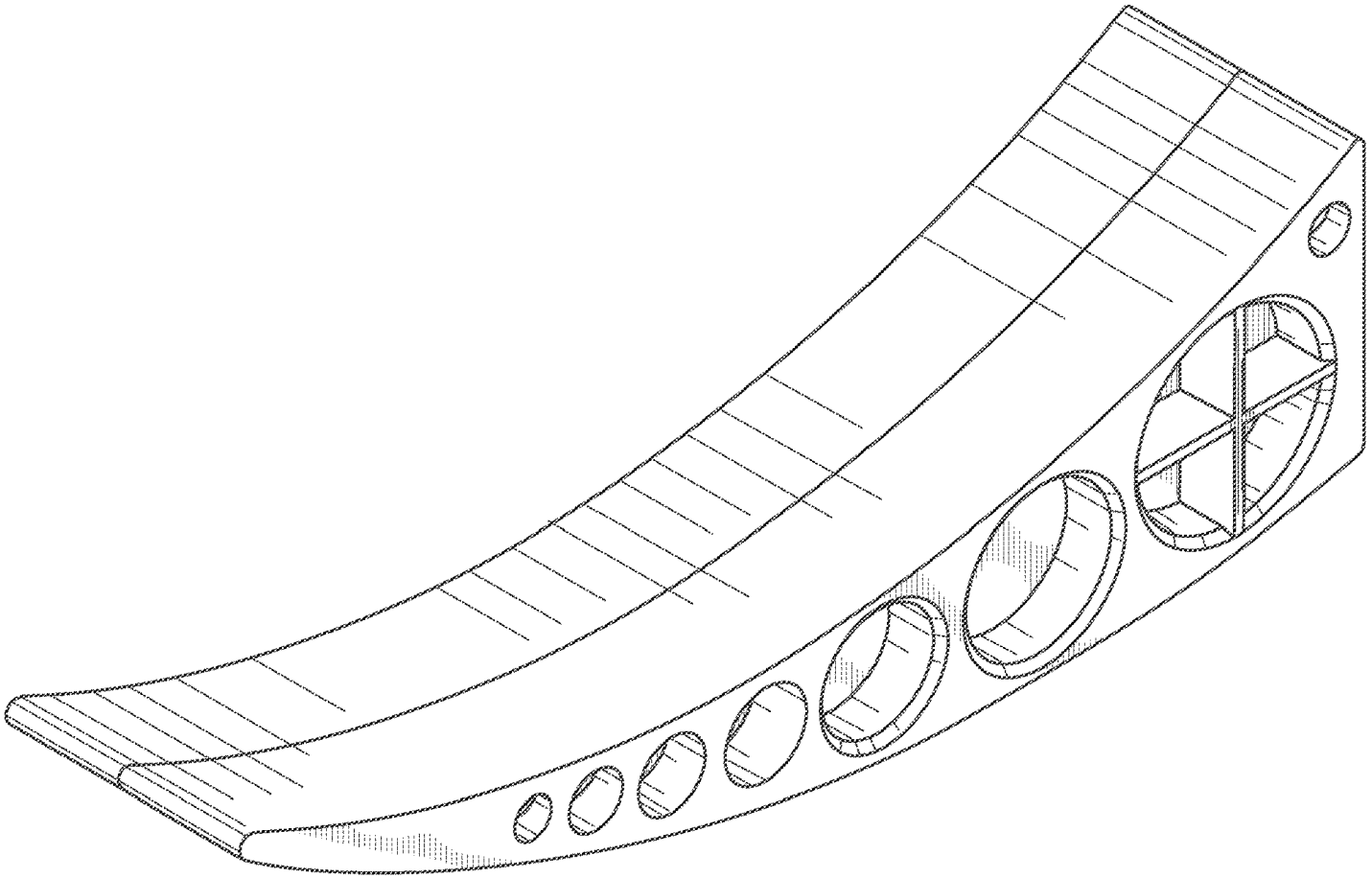
Figure 2:
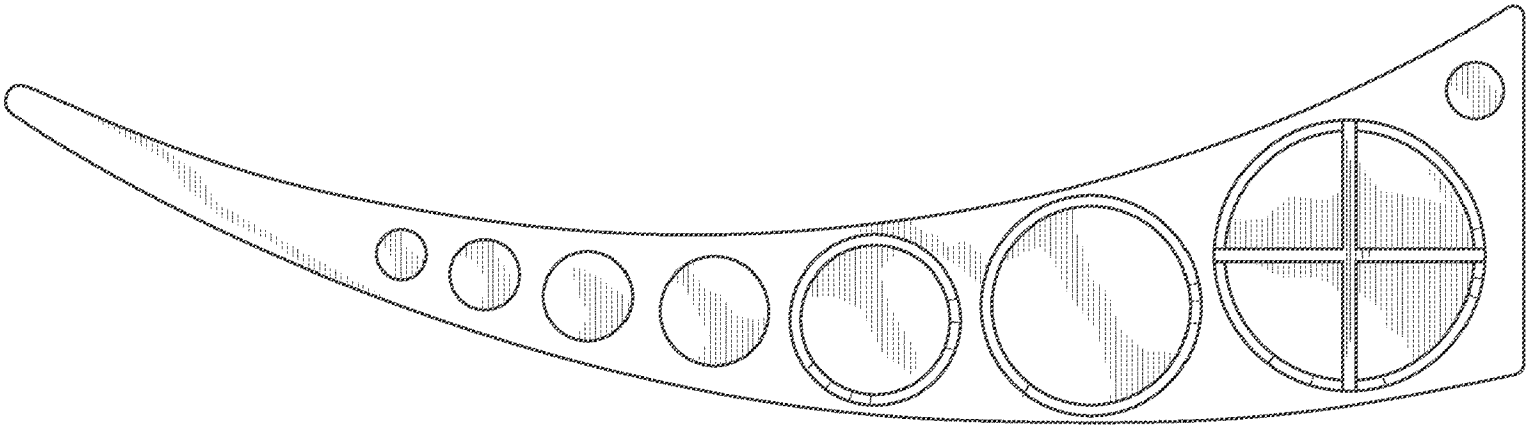
Figure 3:
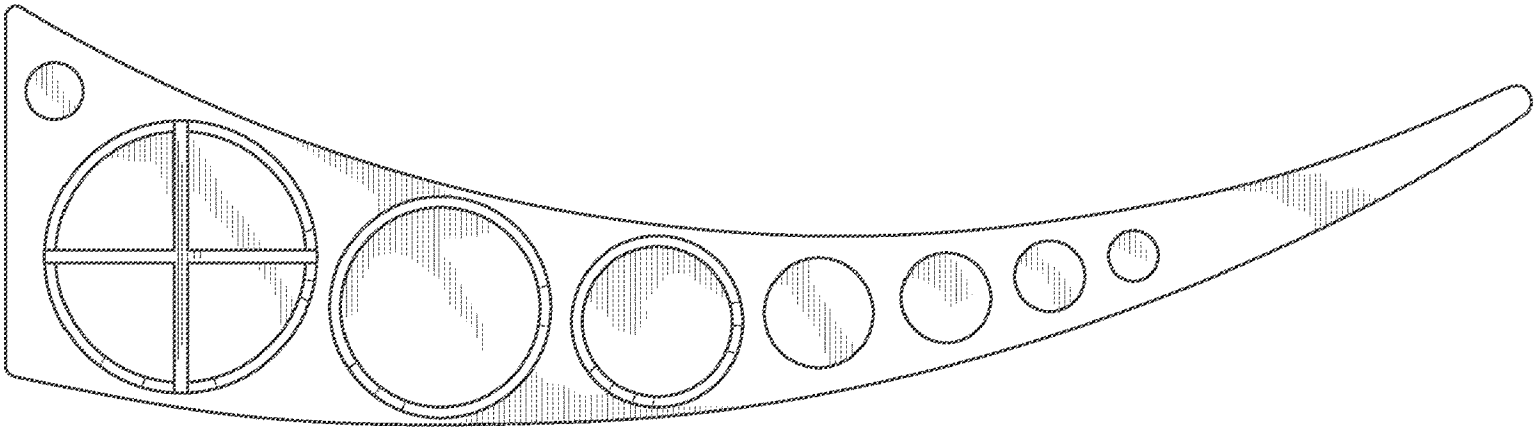
Figure 4:
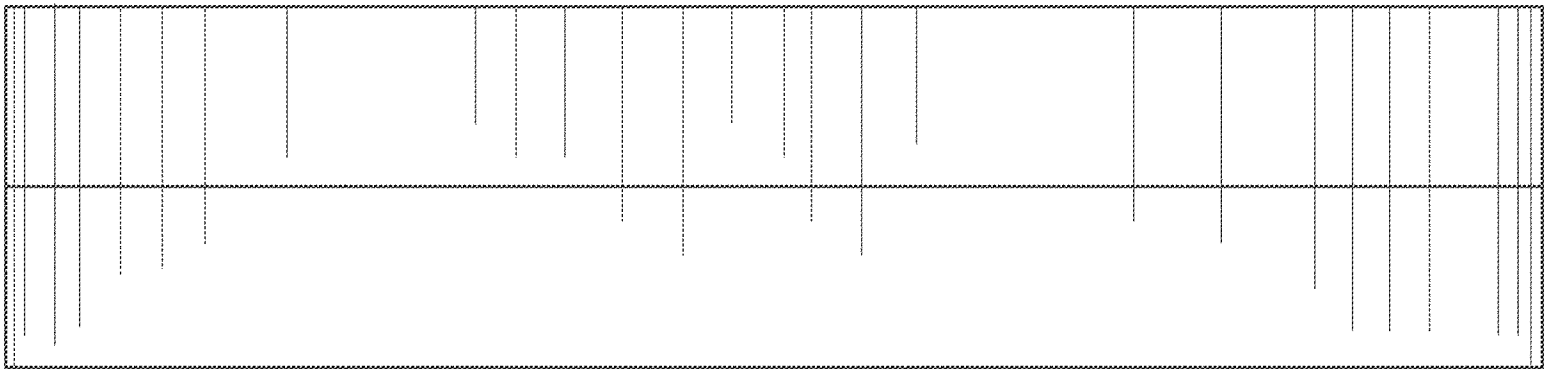
Figure 5:
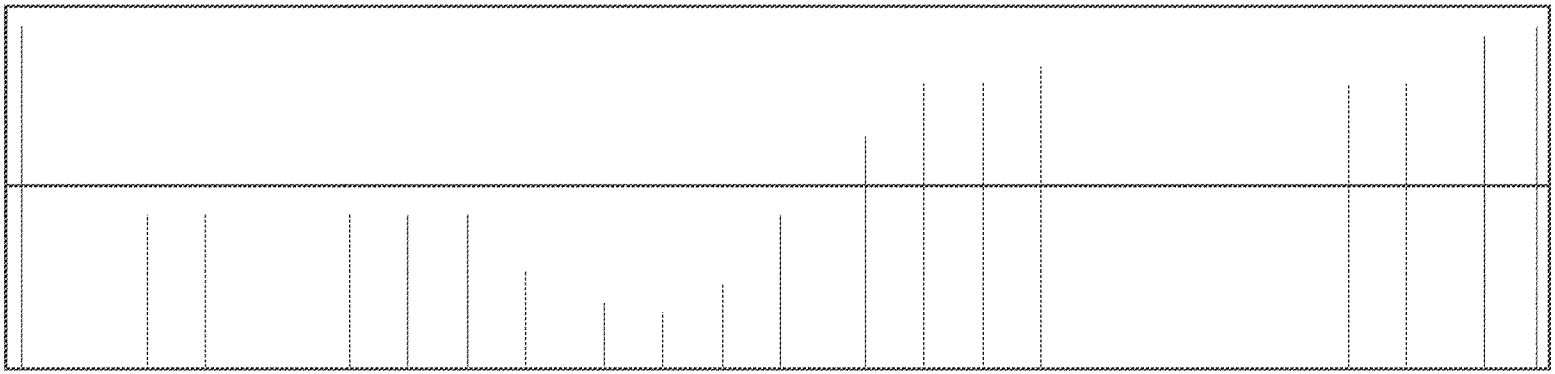
Figure 6:
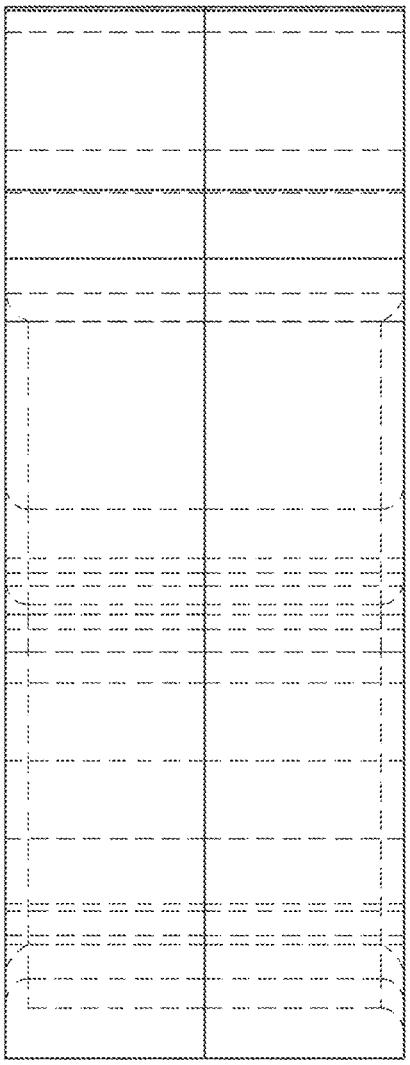
Figure 7:
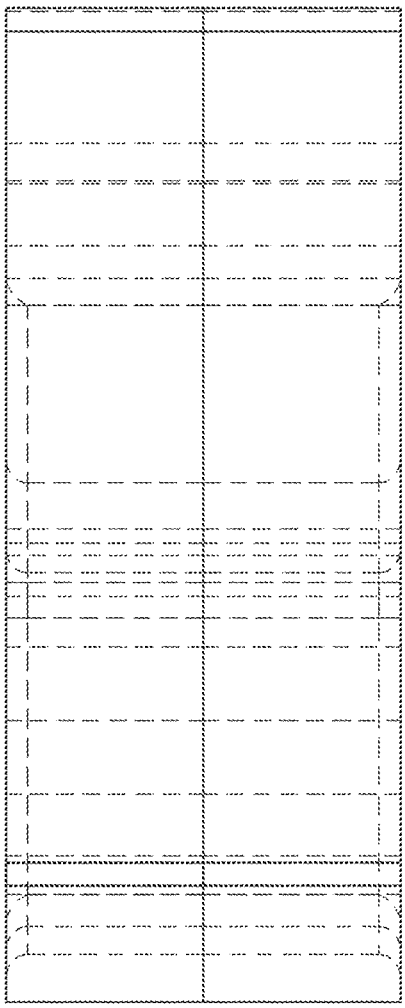

Matter enclosed in heavy brackets [ ] appears in the original patent but forms no part of this reissue; matter printed in italics indicates the additions made by reissue.

AMENDED

(56) References Cited

U.S. PATENT DOCUMENTS

| | | | | | |
|---|---|---|---|---|---|
| D725,748 | S | * | 3/2015 | Lake | D23/259 |
| D796,059 | S | | 8/2017 | Skaar | |
| D801,798 | S | * | 11/2017 | Teng | D8/403 |
| D830,280 | S | * | 10/2018 | Erickson | D12/217 |
| D855,005 | S | * | 7/2019 | Delancey | D12/217 |
| D868,635 | S | | 12/2019 | Angel et al. | |
| D918,522 | S | * | 5/2021 | Angel | D34/32 |
| D918,776 | S | * | 5/2021 | Angel | D12/217 |
| 11,021,350 | B2 | | 6/2021 | Belton | |
| D949,746 | S | * | 4/2022 | Fife | D12/106 |
| D949,747 | S | * | 4/2022 | Alexandru | D12/106 |
| D950,184 | S | | 4/2022 | Roberts et al. | |
| D951,816 | S | | 5/2022 | Zhu | |
| 11,479,217 | B2 | * | 10/2022 | Palmer | B65G 69/005 |
| 2008/0201873 | A1 | | 8/2008 | Haimoff | |
| 2009/0189130 | A1 | | 7/2009 | Heinz | |
| 2011/0094174 | A1 | * | 4/2011 | Meahl | E04F 19/04 52/288.1 |
| 2019/0299943 | A1 | * | 10/2019 | Gregory | B60T 3/00 |
| 2022/0106137 | A1 | * | 4/2022 | Leum | B65G 69/006 |
| 2022/0162021 | A1 | * | 5/2022 | Leum | B65G 69/2882 |
| 2023/0032156 | A1 | * | 2/2023 | Horton | E06C 7/46 |

OTHER PUBLICATIONS

Camco, "Camco RV Curved Leveler with Chock—2 pack—Easy Drive on Leveler Adds Up to 4" in Height (44425)", Retrieved from the Internet: URL: https://www.amazon.com/Camco-Curved-Leveler-Chock-Drive/dp/B0751TG8MH [retrieved on Jul. 8, 2022], Aug. 22, 2017, pp. 1-7.

* cited by examiner

AMENDED

AMENDED

AMENDED

AMENDED

AMENDED

CANCELED

CANCELED